US008479944B2

(12) United States Patent
Moore

(10) Patent No.: US 8,479,944 B2
(45) Date of Patent: *Jul. 9, 2013

(54) ANIMAL-RESISTANT SYSTEM

(75) Inventor: David E. Moore, Temecula, CA (US)

(73) Assignee: Compumeric Engineering, Inc., Ontario, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/728,155

(22) Filed: Mar. 19, 2010

(65) Prior Publication Data

US 2010/0181316 A1     Jul. 22, 2010

Related U.S. Application Data

(63) Continuation of application No. 11/535,396, filed on Sep. 26, 2006, now Pat. No. 7,681,752.

(60) Provisional application No. 60/721,476, filed on Sep. 27, 2005.

(51) Int. Cl.
| | |
|---|---|
| *B65D 45/16* | (2006.01) |
| *B65D 25/00* | (2006.01) |
| *B65D 1/40* | (2006.01) |
| *B65D 3/28* | (2006.01) |
| *B65D 43/14* | (2006.01) |
| *B65D 51/04* | (2006.01) |
| *B65D 1/42* | (2006.01) |
| *B65D 6/34* | (2006.01) |
| *B65D 8/08* | (2006.01) |
| *E05C 5/02* | (2006.01) |
| *E05C 5/00* | (2006.01) |
| *E05C 9/00* | (2006.01) |
| *E05C 19/00* | (2006.01) |
| *E05C 9/12* | (2006.01) |

(52) U.S. Cl.
USPC ........... 220/326; 220/642; 220/643; 220/646; 292/4; 292/6; 292/8; 292/24; 292/56

(58) Field of Classification Search
USPC ................. 220/326, 730, 810, 811, 812, 833, 220/834, 835, 640, 642, 643, 645, 646, 648, 220/649, 650; 292/4, 6, 8, 24, 56
See application file for complete search history.

(56) References Cited

U.S. PATENT DOCUMENTS

| 135,396 A | 2/1873 | Bishop |
| 140,307 A | 6/1873 | Rand |

(Continued)

FOREIGN PATENT DOCUMENTS

| JP | 02016275 A | 1/1990 |
| JP | 06101378 A | 4/1994 |

OTHER PUBLICATIONS

"Bear Resistant Recycling Enclosures", Bear Saver, http://web.archive.org/web/20080318222229/www.bearsaver.conn/RecydingEnclosures.htm; downloaded from web.archive Feb. 16, 2008.

(Continued)

*Primary Examiner* — Anthony Stashick
*Assistant Examiner* — Andrew T Kirsch
(74) *Attorney, Agent, or Firm* — Knobbe, Martens, Olson & Bear, LLP

(57) ABSTRACT

An animal-resistant system for inhibiting access to refuse containers by animals is disclosed. The system comprises at least one latch mechanism, at least one actuation member, at least one shroud member, and a cover defining an opening which permits access to the actuation member. The actuation member communicates with the latch mechanism so as to move the latch mechanism between the latched and unlatched positions. In the latched position, the latch mechanism secures the container lid to the container base, substantially inhibiting access to the container. The access hole and actuation member are dimensioned and positioned on the container in a selected manner so as allow human hands access to the actuation member and unlatch the container while simultaneously inhibiting such access by animals. The shrouds are further configured to inhibit forcible entry into the container when the system is latched.

51 Claims, 9 Drawing Sheets

U.S. PATENT DOCUMENTS

| | | | |
|---|---|---|---|
| 416,433 A | 12/1889 | Wilson |
| 1,044,047 A | 11/1912 | Hess |
| D54,676 S | 3/1920 | Richardson |
| D54,677 S | 3/1920 | Richardson |
| 1,364,209 A | 1/1921 | Richardson |
| D57,379 S | 3/1921 | Richardson |
| D57,380 S | 3/1921 | Richardson et al. |
| D57,593 S | 4/1921 | Dickerman |
| 1,424,519 A | 8/1922 | Richardson |
| 1,424,520 A | 8/1922 | Richard |
| 1,447,462 A | 3/1923 | Butscher et al. |
| 1,460,166 A | 6/1923 | McArthur |
| 1,515,612 A | 11/1924 | O'Connor |
| 1,865,205 A | 6/1932 | Palmquist |
| 1,870,746 A | 8/1932 | Pyle |
| 1,922,062 A | 8/1933 | Sullivan |
| 2,075,495 A | 3/1937 | Aten |
| 2,169,692 A | 8/1939 | Hansen |
| 2,194,408 A | 3/1940 | Sluss |
| D120,270 S | 4/1940 | Martinez |
| 2,594,253 A | 4/1952 | Vander Veer |
| 2,946,640 A | 7/1960 | Sitler |
| 3,084,965 A | 4/1963 | Carosello |
| 3,222,517 A | 12/1965 | Peter |
| 3,586,360 A | 6/1971 | Perrotta |
| 3,793,756 A | 2/1974 | Kay et al. |
| 3,803,738 A | 4/1974 | Weiss |
| D234,288 S | 2/1975 | Kay et al. |
| 3,953,061 A | 4/1976 | Hansen et al. |
| 3,999,792 A | 12/1976 | Smith |
| 4,046,412 A | 9/1977 | Lee |
| 4,319,762 A | 3/1982 | Streit et al. |
| 4,854,448 A | 8/1989 | Hair, II |
| 5,029,909 A | 7/1991 | Bunger |
| 5,092,143 A | 3/1992 | Rumbles |
| D327,152 S | 6/1992 | Rose et al. |
| 5,118,037 A | 6/1992 | Ekegren |
| D328,659 S | 8/1992 | Brenner et al. |
| D332,332 S | 1/1993 | Markey |
| D333,541 S | 2/1993 | Kropf |
| D338,758 S | 8/1993 | Sexton et al. |
| D345,239 S | 3/1994 | Cooper |
| 5,341,752 A | 8/1994 | Hambleton |
| 5,385,258 A | 1/1995 | Sutherlin |
| D356,419 S | 3/1995 | Kamm |
| 5,470,115 A | 11/1995 | Berg et al. |
| 5,509,700 A | 4/1996 | Kennedy, Jr. |
| 5,601,206 A | 2/1997 | Haas et al. |
| D381,156 S | 7/1997 | Kent |
| D389,631 S | 1/1998 | Peters |
| 6,065,314 A | 5/2000 | Nicholson |
| D446,373 S | 8/2001 | Weiss et al. |
| 6,454,320 B1 | 9/2002 | Weinerman et al. |
| 6,508,087 B2 | 1/2003 | Lemley et al. |
| D480,854 S | 10/2003 | Hardy et al. |
| 6,688,656 B1 | 2/2004 | Becken |
| 6,771,183 B2 | 8/2004 | Hunter |
| 6,783,162 B1 | 8/2004 | Harper |
| D507,687 S | 7/2005 | Moon et al. |
| 7,062,945 B2 | 6/2006 | Saitoh et al. |
| D536,853 S | 2/2007 | Presnell |
| D537,223 S | 2/2007 | Lin |
| D537,596 S | 2/2007 | Marshall |
| D538,995 S | 3/2007 | Lin |
| D545,374 S | 6/2007 | Gollob |
| 7,237,812 B2 | 7/2007 | Tweedy |
| D549,418 S | 8/2007 | Boydston et al. |
| D551,414 S | 9/2007 | Weiss |
| D558,421 S | 12/2007 | DesLaurier |
| D558,947 S | 1/2008 | Gardner et al. |
| D566,921 S | 4/2008 | Skalka |
| D577,171 S | 9/2008 | Moore |
| D587,874 S | 3/2009 | Lin |
| D606,721 S | 12/2009 | Moore |
| D612,560 S | 3/2010 | Moore |
| D613,019 S | 3/2010 | Moore |
| 7,681,752 B2 | 3/2010 | Moore |
| 7,775,564 B2 | 8/2010 | Moore |
| 2004/0069787 A1 | 4/2004 | Gruennert et al. |
| 2007/0046032 A1 | 3/2007 | Moore |
| 2007/0084865 A1 | 4/2007 | Moore |
| 2010/0307062 A1 | 12/2010 | Moore |
| 2011/0000011 A1 | 1/2011 | Gebka |

OTHER PUBLICATIONS

"Bear Resistant Trash Enclosures", Bear Saver, http://web.archive.org/web/20080402133700.www.bearsaver.com/TrashEnclosures.htm; downloaded from web.archive Feb. 16, 2008.

"Non Bear Resistant Trash and Recycling Enclosures", Bear Saver, http://web.archive.org/web/20080219235907/www.bearsaver.com/TrashAndRecycling.htm; downloaded from web.archive Feb. 16, 2008.

ANIMAL-RESISTANT SYSTEM

CROSS-REFERENCE TO RELATED APPLICATIONS

This application is a continuation of U.S. patent application Ser. No. 11/535,396, filed Sep. 26, 2006, now U.S. Pat. No. 7,681,752, entitled ANIMAL-RESISTANT SYSTEM which claims the benefit of priority under 35 U.S.C. §119(e) of U.S. Provisional Application No. 60/721,476 filed on Sep. 27, 2005 by David Moore, entitled BEAR PROOF POLY CART LATCH, the entirety of which are incorporated herein by reference.

BACKGROUND OF THE INVENTION

1. Field of the Invention

The present invention relates to latching systems and, in particular, concerns a latching system for use with a container to inhibit access to the interior of the container by animals.

2. Description of the Related Art

Food and food-containing refuse generated by humans can attract the attention of animals in areas adjacent to animal habitats. Animals, such as bears, have a keen sense of smell and can easily detect food which is stored or discarded in containers left outdoors such as storage lockers and refuse bins on streets or in parks. Because these outdoor containers are accessible and plentiful, they are an attractive source of food for animals compared to foraging in their natural habitat. Furthermore, once animals learn that this source of food is available, they may lose their wariness towards humans and frequently return to areas where the food was located, increasing the probability of an animal-human encounter.

The attraction of animals, and bears in particular, to human populated areas is problematic. The size and strength of some animals, bears, for example, makes them a potential threat to people or property they encounter while attempting to access containers containing food. Further, animals entering settled areas can become injured or killed by moving automobiles, electrical lines, and other human technologies. Thus, to protect people, property, and the animals themselves, it is desirable to inhibit animals from accessing containers storing food and food containing refuse.

Latch systems are commonly placed on containers for this purpose. For example, a common latch system employs a latch which is actuated by a pair of thumb and finger clips to secure the lid of the container in place when the lid is closed. Other systems may further employ large, heavy reinforcing components on the lid of a container, designed to inhibit animals from physically damaging the container in order to gain access.

These latch systems are problematic, however. In one aspect, the latches can require significant dexterity to operate, presenting difficulties for children, the elderly, or the handicapped. In another aspect, these latch mechanisms may require a user to re-engage the latch after each use. Should the user forget to re-engage the latch, the receptacle is vulnerable to animals. In a further aspect, the latches are not guarded against animal access. Thus, animals, by luck, persistence, or cleverness, may succeed in operating the latch to open the container.

In an additional aspect, the reinforcing components can cause premature failure of the container. The reinforcing components may comprise solid, heavy components attached to the container lid which are designed to resist deformation from an animal attempting forcible entry into a container. The added weight of the reinforcing components, however, typically causes damage to container hinge after repeated use of the container. As a result, repair or replacement of the container is required, at the expense of the owner.

These deficiencies in current latch designs illustrate the need for improved animal-resistant latch systems which are easy to use and mechanically robust, while also reducing the potential for user error.

SUMMARY OF THE INVENTION

In one aspect, the preferred embodiments of the present invention provide an animal-resistant system for securing a lid of a container having a base, where the lid is positioned inward of the base. The system comprises at least one latch mechanism that interconnects the lid and the base of the container, where the at least one latch mechanism has a first orientation where the lid and the base are secured together and a second orientation where the lid can be removed from the base. The system further comprises at least one actuation member coupled to the at least one latch mechanism, where a user can manipulate the actuation member to thereby manipulate the at least one latch from the first to the second orientation. The system additionally comprises a cover that covers the actuation member, where the cover defines an opening that is spaced from the actuation member a distance and direction selected to permit user manipulation of the actuation member by a human finger but to inhibit manipulation by an animal claw.

In another aspect, the preferred embodiments of the present invention provide an animal-resistant system for securing a lid of a container having a base, where the lid is positioned inward of the base. The system comprises at least one latch mechanism that interconnects the lid and the base of the container, where the at least one latch mechanism has a first orientation where the lid and the base are secured together and a second orientation where the lid can be removed from the base. The system also comprises at least one actuation member coupled to the at least one latch mechanism, where a user can manipulate the actuation member to thereby manipulate the at least one latch from the first to the second orientation. The system further comprises at least one shroud member that is mounted on the inner edge of the base of the container, adjacent to the interface between the base and the lid of the container, to inhibit a bear from accessing an edge of the lid of the container adjacent to the base. The system additionally comprises a protective member mounted on the portion of the lid of the container that is adjacent to the interface with the base, where the protective member is formed of a rigid material so as to inhibit the bear from deforming the portion of the lid adjacent to the interface with the base.

In a further aspect, the preferred embodiments of the present invention provide an animal-resistant container. The container comprises a receptacle having a base and a lid, where the lid is positioned inward of the base. The container also comprises at least one latch mechanism that interconnects the lid and the base of the container, where the at least one latch mechanism has a first orientation, where the lid and the base are secured together and a second orientation where the lid can be removed from the base. The container further comprises at least one actuation member coupled to the at least one latch mechanism, where a user can manipulate the actuation member to thereby manipulate the at least one latch from the first to the second orientation. The container additionally comprises a cover that covers the actuation member, where the cover defines an opening that is spaced from the actuation member a distance and direction selected to permit user manipulation of the actuation member by a human finger but to inhibit user manipulation by an animal claw.

BRIEF DESCRIPTION OF THE DRAWINGS

These and other objects and advantages will become more apparent from the following description taken in conjunction with the accompanying drawings.

DETAILED DESCRIPTION OF THE PREFERRED EMBODIMENT

Some embodiments of the present invention relate to an animal-resistant system directed towards inhibiting the access of bears to food-containing receptacles. However, the embodiments of the invention may be applied to inhibiting the access of animals in general to containers.

Figure 1A:
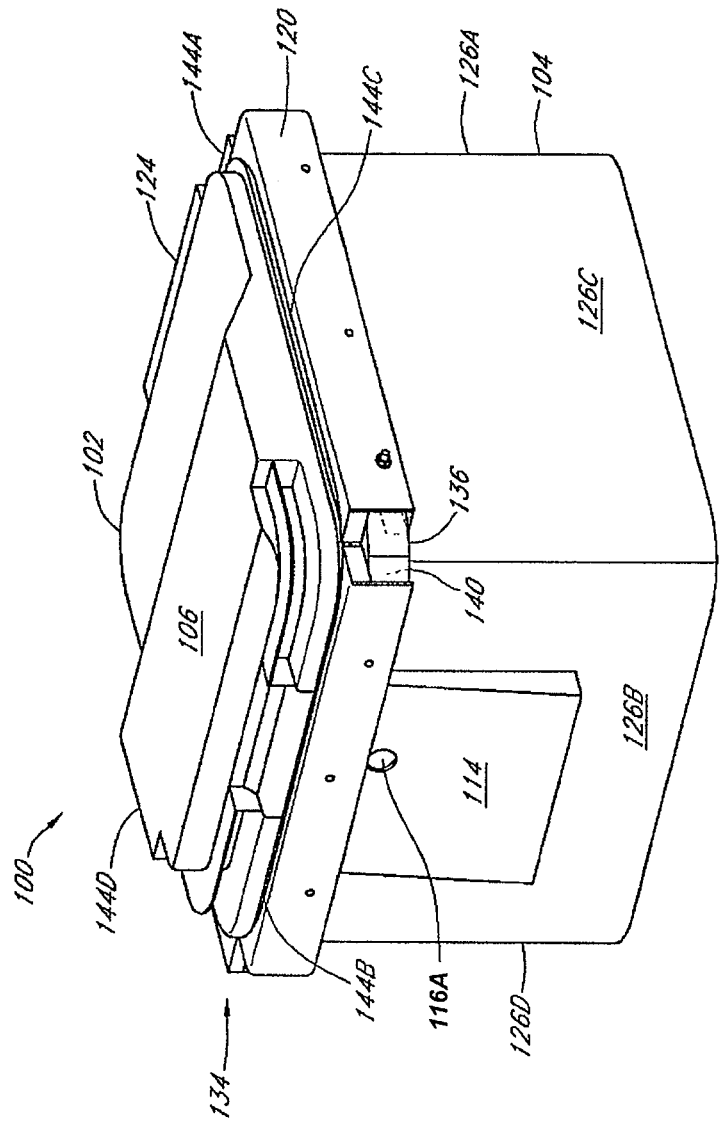
FIGS. 1A-1B illustrate perspective views of a container equipped with one embodiment of an animal-resistant system in the opened and closed positions.
Figure 1B:
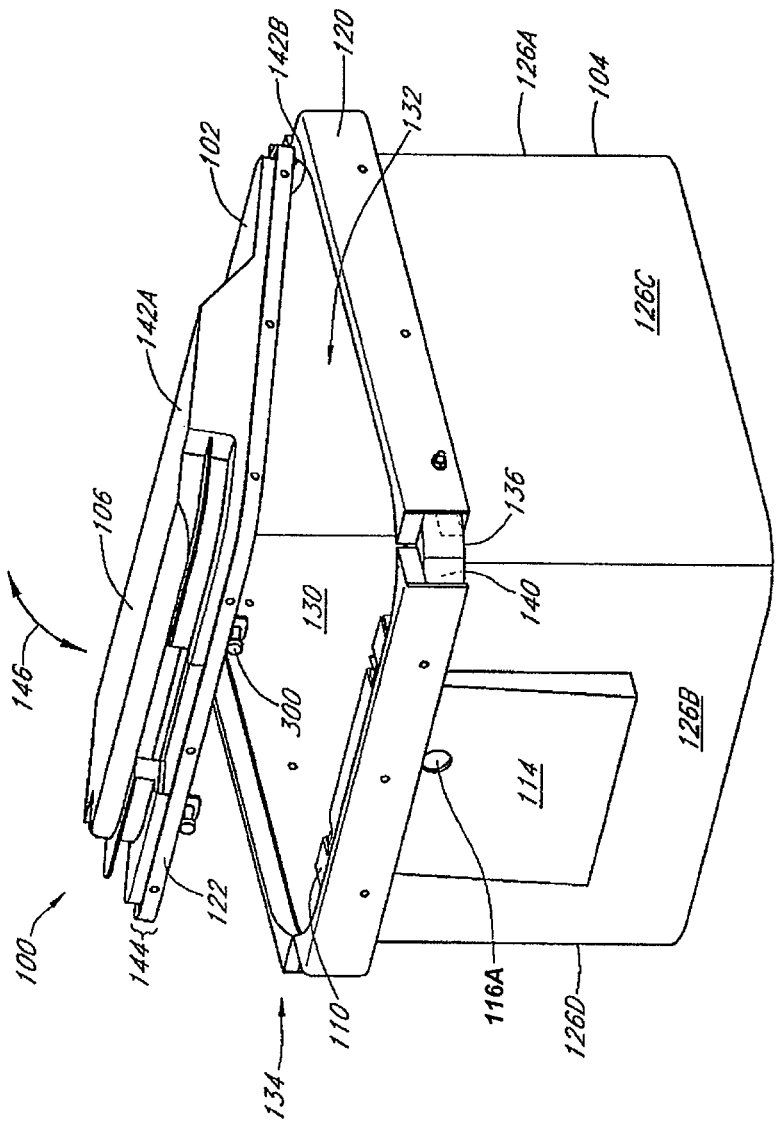

FIGS. 1A-1B illustrate perspective views of one embodiment of an animal-resistant system 100. Generally, the system 100 is adaptable for use with a container 102 possessing a base 104 and a lid 106. The lid 106 is positioned inward of the base 104 in order to inhibit animals from accessing the contents of the container 102. Such containers 102 may include, but are not limited to, campground food storage boxes and outdoor trash receptacles, including business and household receptacles.

The system 100 comprises at least one latch mechanism 110 which secures the lid 106 to the base 104, at least one actuation member 112 (FIG. 2) which allows a user to manipulate the latch mechanism 110 to release the lid 106, a cover 114 which protects the actuation member 112 and provides an opening 116A by which the actuation member may be manipulated, at least one shroud member 120 which inhibits access to the interface between the base 104 and lid 106, and a protective member 122 which provides additional reinforcement.

Advantageously, in one aspect, the system 100 exploits differences in animal and human physiology to substantially secure containers 102 in a manner that inhibits animal access but permits simple and convenient human access. Additionally, in a second aspect, the system 100 secures the container against forcible entry from large, strong animals. These and other features and advantages of the system 100 will be described in detail below.

FIGS. 1A-1B illustrate one embodiment of a container 102 equipped with the system 100. In one embodiment, the container 102 comprises the base 104 and the lid 106, interconnected by a hinge 124. The base 104 is generally elongate and rectangular, with interconnected base walls 126A-126D (collectively, walls 126) that define a container interior 130 possessing a generally square cross-section. While the cross-section of the illustrated embodiment is generally square, a person of ordinary skill will realize that any of a number of known shapes of receptacles can be used with the latching system 100 disclosed herein without departing from the spirit of the present invention.

Refuse or other items stored within the container interior 130 are accessed through a container mouth 132 at an upper end 134 of the container 102. The base 104 also comprises a generally "L"-shaped container lip 136, located at about the container upper end 134. The lip 136 extends outward from the base 104, at the upper end 134, approximately parallel to the plane of the container mouth 132 and bends approximately 90 degrees so as to orient a portion of the lip approximately parallel to the walls 126. In this manner, the lip 136 defines a space 140 where a portion of the shrouds 120 may be mounted for protection of the lid 106, as discussed below.

The container lid 106 is configured to move between an open and a closed position in order to selectively allow and inhibit access to the container interior 130 through the container mouth 132. In one embodiment, the lid 106 is generally planar, possessing an upper surface 142A, a lower surface 142B, and a lid edge 144 which spans the distance between the surfaces 142A and 142B about the periphery of the lid 106. The lid 106 is further dimensioned so as to span the container mouth 132. In one particular embodiment, the lid 106 is generally rectangular, possessing a plurality of edges 144A-D. The hinge 124 is positioned along the edge 144A of the lid 106 and interconnects the lid 106 to the base 104. The hinge 124 is configured so to allow the lid 106 to pivot, indicated by arrow 146, between the open and closed positions. In the closed position, FIG. 1A, at least a portion of the lower surface 142B of the lid 106 rests against the upper end 134 of the container base 104, substantially obstructing access to the container interior 130 through the container mouth 132. In the open position, FIG. 1B, the lid 106 does not obstruct to the container mouth 132, allowing access to the container interior 130 through the mouth 132.

In one embodiment, the container 102 may be constructed of injection molded high-density polyethylene (HDPE). However, alternate embodiments of the container 102 may be fabricated using generally understood fabrication methods with any appropriate materials, including, but not limited to, other plastics, metals, and woods. It may be understood that the embodiments of the system 100 may be resized and otherwise adapted to fit containers of arbitrary size, geometry, material, and brand, without departing from the scope of the present invention, and are not limited to any particular embodiment of the container 102 disclosed.

In one function, the system 100 secures the lid 106 to the container base 104. In one embodiment, this function is accomplished by use of the latch mechanism 110 in conjunction with the actuation member 112. One embodiment of the latch mechanism 110 is presented in FIGS. 2 and 3A. As will be described in greater detail below, the latch mechanism 110 is movable between a latched orientation, where the latch mechanism 110 inhibits movement of the lid 106 from the closed position in order to deny access to the container interior 130, and an unlatched orientation, wherein the latch mechanism 110 allows movement of the lid 106 from the closed position for access into the container interior 130. Beneficially, as discussed in greater detail below, embodiments of the latch mechanism 110 may be configured to automatically return the latch mechanism 110 to the latched orientation when the lid 106 is re-closed, eliminating the need for the user to manually re-engage the latch mechanism 110 and ensuring that the lid 106 in the latched position is closed.

Figure 3A:
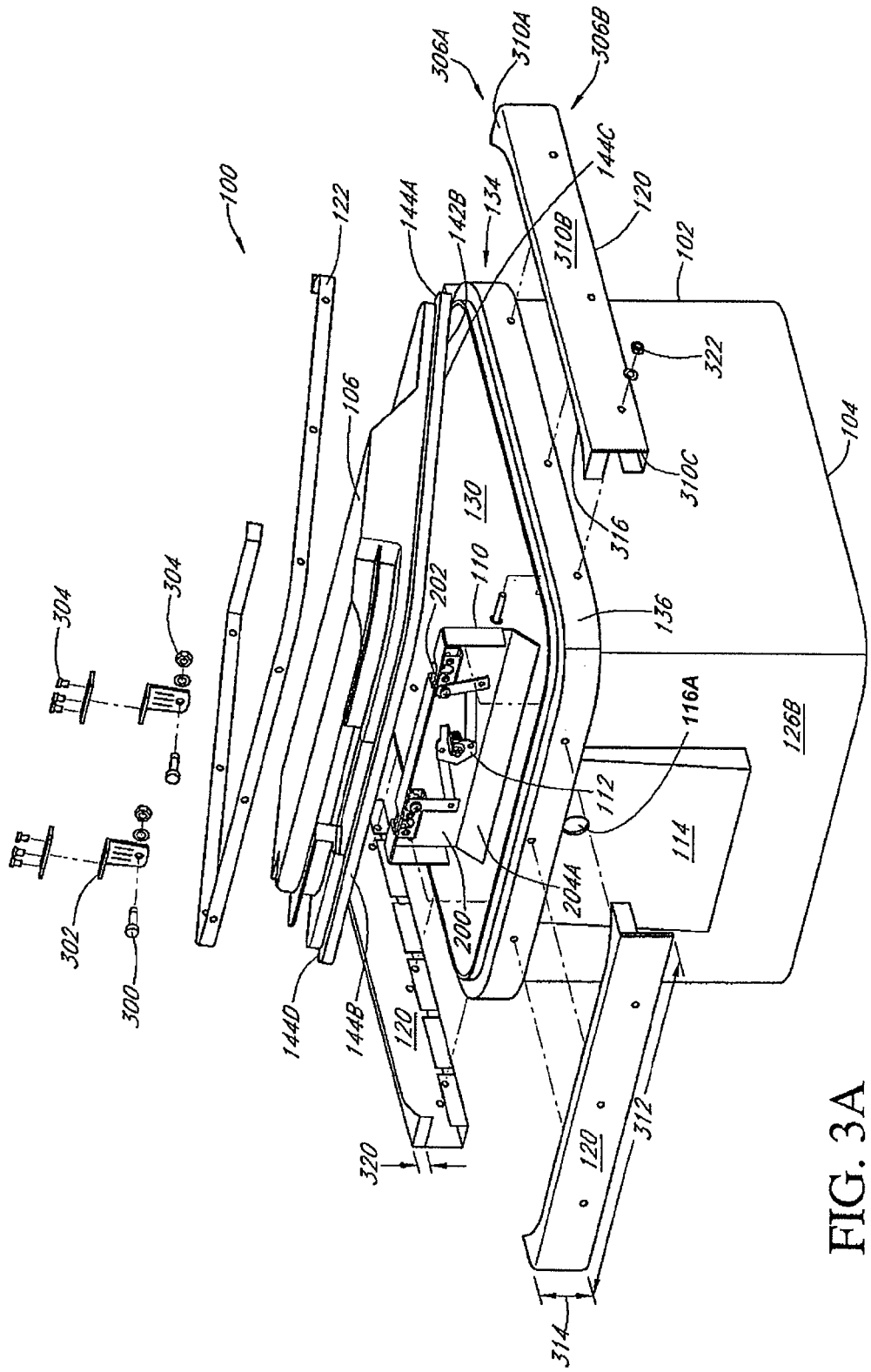
FIGS. 3A-3B illustrate front and rear views of the container, illustrating embodiments of the shroud members.

Referring to FIGS. 1B and 3A, in one embodiment, the lower surface 142B of the lid 106 is equipped with striker pins 300 which engage the latch mechanism 110 to secure the lid 106 to the base 104. When the lid 106 is moved from the open to the closed position, the striker pins 300 follow a trajectory which enters latch mechanism 110. As discussed in greater detail below, the latch mechanism 110 is configured to reversibly capture the striker pins 300, inhibiting the striker pins 300 from substantial motion and securing the lid 106 in the closed position. The striker pins 300 comprise generally elongated rods that are positioned adjacent to the lower surface 142B of the lid 106. In one embodiment, a bracket 302 is interconnected to the lower surface 142B of the lid 106 to secure the striker pins 300 in place. The bracket 302 extends downward, approximately perpendicular to the plane of the lid 106, and the striker pins 300 are interconnected to the bracket 302 and extend outward from the bracket 302, approximately parallel to the plane of the lid 106. The bracket 302 and striker pins 300 are positioned on the lid 106 such that the striker pins 300 are substantially aligned with, and are captured by, the latch mechanism 110 when the lid 106 is in the closed position. The bracket 302, striker pins 300, and lid 106 may be interconnected by fasteners 304 such as washers, nuts, rivets or other appropriate attachment devices.

Figure 2:
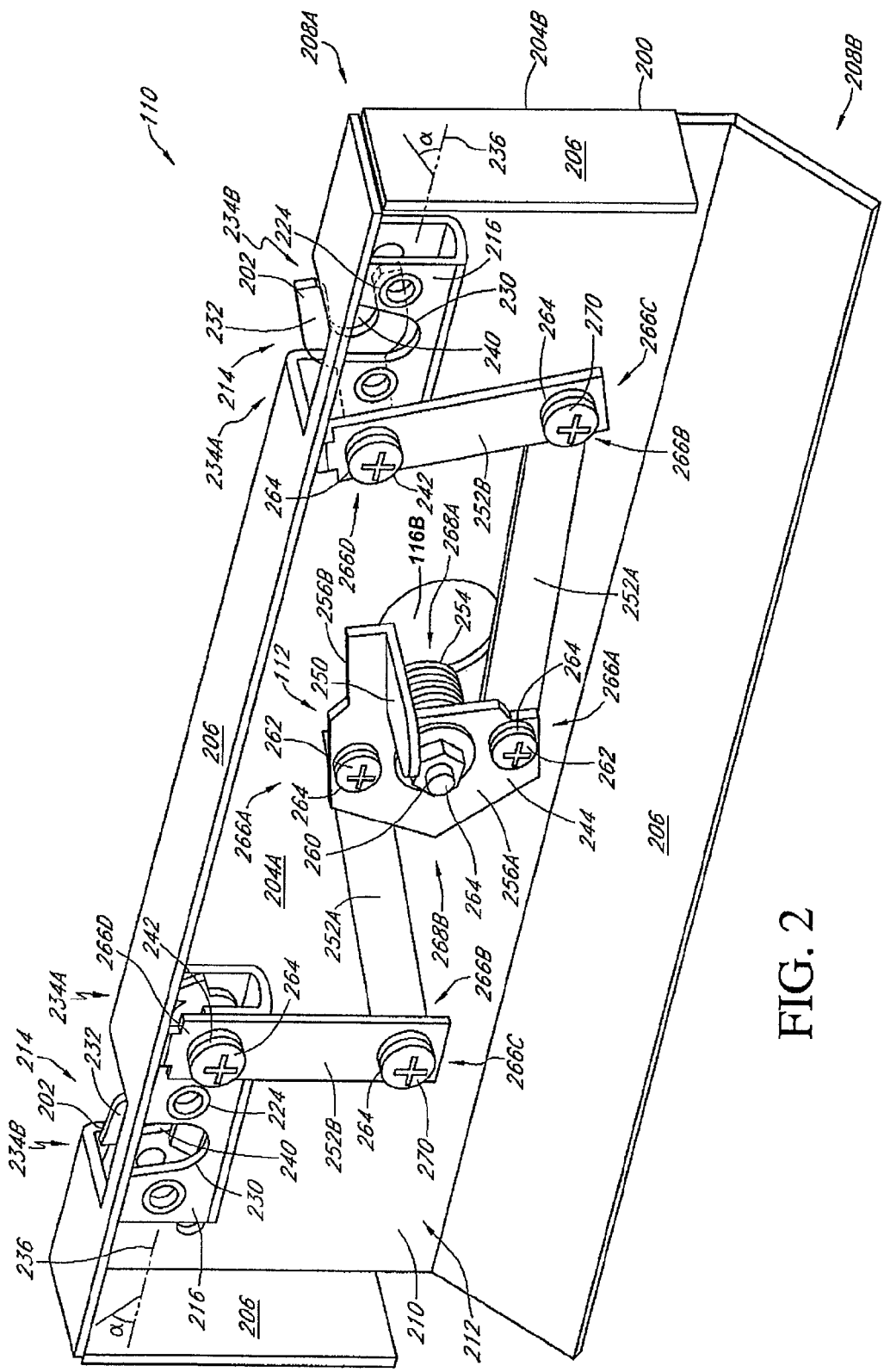
FIG. 2 is a perspective view of the latch mechanism of FIG. 1.

FIG. 2 illustrates one embodiment of the latch mechanism 110, comprising a latch housing 200 and a plurality of latches 202. The latch housing 200 is generally rectangular, having first and second sides 204A and 204B and upper and lower ends 208A and 208B. A plurality of sidewalls 206 extend outward from the periphery of a center plate 210, defining an area 212 in which the actuation member 112 and latches 202 are positioned. The sidewalls 206 may extend generally perpendicular to the plane of the center plate 210 or at other angles, as necessary. The opening 116B is also formed in the center plate 210, adjacent to the actuation member 112, to allow exterior access to the actuation member 112. The opening 116B may be positioned on any side adjacent to the actuation member 112, as necessary. As discussed in greater detail below, the housing 200, actuation member 112 and latches 202 are mounted within the container interior 130, where the housing 200 protects the actuation member 112 and latches 202 against damage or interference from refuse or other objects within container interior.

The latch housing 200 is also configured to receive the latches 202 and striker pins 300. The sidewall 206 at the upper end 208A of the housing 200 is configured with housing apertures 214 which allow the striker pins 300 to enter the housing 200 for capture within the latches 202. A hollow, generally rectangular latch mount 216 is interconnected to the housing 200, adjacent to the housing aperture 214, by rivets 224 or other mounting devices to provide a mounting surface for the latches 202. The latch mount body 216 is further configured with an open side facing the housing aperture 214 and a groove 230 oriented approximately normal to the housing aperture 214. The open side and groove 230 allow the striker pin 300 to seat within the latch mount 216 when secured by the latch 202, substantially constraining motion of the striker pin 300, as discussed below.

FIG. 2 also illustrates the latches 202. In one embodiment, the latches 202 may comprise rotary latches 202. The rotary latches 202 are generally well known, possessing an elongate, roughly "Y"-shaped body 232 having first and second ends 234A and 234B. A channel 240 extends along a portion of the length of the latch 202 and terminates at the second end 234B. The channel is dimensioned to receive the striker pins 300 within, allowing the lid to be secured to the base, as discussed in greater detail below. The latches 202 are mounted within the latch housing 200 at a latch pivot 242 positioned at the first end 234A of each latch 202.

The latches 202 are configured to reversibly move between a latched and an unlatched orientation about the latch pivot 242, allowing the lid 106 to be reversibly secured to the base 104 by the latches 202. In the unlatched orientation, the length of the latch body 232 is oriented at an angle $\alpha$ with respect to a horizontal axis 236 of the latch mechanism 110. In one embodiment, $\alpha$ is between approximately 30 to 90 degrees. In this orientation, when the lid 106 moves from the open to closed positions, the striker pins 300 may enter the channels 240 of the latches 202 through the apertures 214.

Moving the latches 202 from the unlatched to latched positions when the lid 106 is in the closed position secures the lid 106 to the base 104. In the latched orientation, the length of the latches 202 are oriented approximately horizontal within the latch mounts 216. Thus, as the latches 202 move from the unlatched orientation to the latched orientation, the second ends 234B of the latches 202 rotate downward about the latch pivots 242, away from the apertures 214. Concurrent with this motion, when the lid 106 is in the closed position, the latch bodies 232 retain the striker pins 300 within the channels 240. With the latches 202 so latched, upwards motion of the lid 106 towards the open position causes the striker pins 300 to contact the latch bodies 202. However, the latch pivots 242 are configured such that the latches 202 cannot pivot upwards towards the unlatched position without actuation of the actuation member 112, as discussed in greater detail below. Thus, in the latched position, the latches 202 inhibit the motion of captured striker pins 300, which in turn inhibits the motion of the lid 106 from the closed position, securing the lid 106 to the base 104.

Advantageously, the components of the latch mechanism 110 and the striker pins 300 may be fabricated from metals, metallic alloys, or other high strength materials. This high strength construction allows the latch mechanism 110 of the system to robustly secure the lid 106 against an animal which attempts to forcibly move the lid 106 when the lid 106 is secured to the base 104.

FIG. 2 also illustrates the actuation member 112 in communication with the latch mechanism 110. In one embodiment, the actuation member 112 may comprise a cam assembly 112. As will be described in detail below, actuation of the cam assembly 112 moves the latches 202 between the latched and unlatched orientations, allowing the lid 106 to be moved from the closed to open positions. Releasing the cam assembly 112 returns the latch mechanism 110 back to the latched orientation. The cam assembly 112 comprises a rotatable cam body 244, a plurality of pivots (such as a central cam pivot 260, cam body pivots 262, and cam arm pivots 270), a lever 250, a plurality of cam arms 252A-B (collectively 252), and a plurality of washers 254.

The rotatable cam body 244 is generally planar, possessing a first side 256A and a second side 256B. The central cam pivot 260 and cam body pivots 262 are provided within the cam body 244. The central cam pivot 260 is roughly centered within the cam body 244, while the cam body pivots 262 are positioned about the central cam pivot 260 to provide a pivoting attachment point for the cam arms 252A-B to the cam body 244. In one embodiment, the cam body pivots 262 are aligned approximately vertical with respect to the central cam pivot 260. The lever 250 is interconnected to the periphery of the cam body 244 and extends outward from the first side 256A of the rotatable cam body 244. In one implementation, the rotatable cam body 244 is formed of a stamped metal, such as steel.

In one embodiment, generally rectangular first and second cam arms 252A and 256B connect the rotatable cam body 244 to the latches 202. The first cam arm 256A possesses a first end 266A and a second end 266B, while the second cam arm 256B possesses a first end 266D and a second end 266C. The first end 266A of the first cam arm 256A is interconnected to the cam body 244 at the cam body arm pivot 262 while the second end 266B of the first cam arm 256A is interconnected to the second end 266C of the second cam arm 256B at a cam arm pivot 270. The first end 266D of the second cam arm 256B is interconnected with the first end 234A of the latch 202 at the latch pivot 242. Upon actuation of the cam body 244, the pivots 242, 260, 262, and 270 cause the cam arms 252 to move such that the latches 202 are rotated from the latched to unlatched orientation, as discussed below with respect to FIGS. 4A-4B.

In one embodiment, the pivots 242, 260, 262, and 270 comprise through holes formed in their respective components into which pivot pins 264 comprising bolts, threaded rods, rivets, or other rod-like fasteners are positioned, as illustrated in FIG. 2. For example, in the case of the latch pivot 242, holes are formed in the first end 266D of the second cam arm 252B and the first end 234A of the latches 202. The pivot pins 264 are generally elongate and cylindrical, possessing a first end 268A and a second end 268B. (For clarity, the ends 268A-B are only illustrated on the pivot pin 264 of the cam body pivot 260 in FIG. 2, however each of the pivot pins 242, 260, 262, and 270 may be understood to possess first and second ends 268A-B). In the latch pivots 242 and the cam body pivot 260, the first end 268A of the pivot pins 264 are interconnected to the first side 204A of the housing center plate 210, extending outward, approximately perpendicular to the plane of the center plate 210. The second end 268B of the pivot pins 264 are configured to secure the cam body 244 and latches 202 to the housing 200, such as with a thread and nut, allowing each to pivot in place. In the case of the cam body arm pivots 262 and cam arm pivots 270, the pivot pins 264 pivotably connect the cam arms 252A to the cam body 244 and the cam arms 252A-B, respectively.

The rotatable cam body 244 and latches 202 are mounted to the housing 200 at the pivots 242 and 260. The second end 264B of the pivot pins 264 are inserted through the rotatable cam body 244 and latches 202 at their respective pivots 242, 260 and placed at rest on the pivot pins 264. The plurality of washers 254 are interposed between the housing 200 and the rotatable cam body 244, on the pivot pin 264, to position the lever 250 at the selected position with respect to the openings 116A, 116B, as discussed in greater detail below. The rotatable cam body 244 is secured in place on the pivot pin 264 by a thread and nut or other fastening device positioned at the second end 264B of the pivot pin 264. In this manner, the rotatable cam body 244 is supported and allowed to pivot freely by the pivot pin 264, while being restrained from removal from the pivot pin 264, once mounted thereon.

FIG. 3A illustrates the latch mechanism 110 mounted to the base 104 of the container 102. The latch mechanism 110 is positioned within the container interior 130, opposite the hinge, and adjacent to the upper end 134 of the container base 104. So positioned, the housing first side 204A faces towards the cover 114 and imposes the housing 200 between the container interior 130 and the latches 202 and actuation member 112. In this manner, the cover 114 and the housing 200 protect the latches 202 from damage or obstruction resulting from objects within the container 102. The latch mechanism 110 is further oriented with respect to the striker pins 300 so as to allow capture of the striker pins 300 when the lid 106 is closed, as discussed above. An opening force exerted adjacent to the edge 144B, approximately perpendicular to the plane of the lid 106, results in a high torque with which to open the lid 106.

Therefore, placing the latch mechanism 110 in this location inhibits this location from being used to apply the opening force. An opening force applied at an alternative location, along one of the edges 144C or 144D adjacent to the edge 144A containing the hinge will need to be greater than the force applied at the second edge 144B of the lid 106 to generate the same torque. However, as will be discussed below, the shrouds 120 inhibit access to the lower surface 142B of the lid 106. In this fashion, the latch mechanism 110 and the shrouds 120 complementarily inhibit the opening of the lid 106 when the latch mechanism 110 is in the latched orientation, enhancing the security provided by the animal-resistant system 100.

The embodiment of FIG. 3A also illustrates the cover 114. In one embodiment, the cover 114 comprises a generally flat, rectangular component which is positioned on the base wall 126B, generally abutting the container lip 136. It may be understood, however, that the cover may adopt other shapes, as necessary, such as circular, ovular, and triangular. So positioned, the cover 114 is configured to both protect and provide access to the actuation member 112. In one embodiment, the cover 114 defines the opening 116 adjacent to the actuation member 112. The openings 116A, 116B provide a pathway from the exterior of the container 102 to the actuation member 112, allowing the actuation member 112 to be manipulated so as to unlatch the latch mechanism 110. As discussed in greater detail below with respect to FIG. 6, in one embodiment, the openings 116A, 116B are spaced from the actuation member 112 by a distance and direction selected to permit manipulation of the actuation member 112 by a human hand but inhibit such actuation by an animal such as a bear.

The cover 114 also reinforces the area about the opening 116A to protect the container 102 from animal access. The opening 116A presents a pathway through the cover 114 which an animal could forcibly expand in order to gain access to the container interior 130. This issue may be of particular concern when utilizing plastic containers 102 which might be torn open at the opening 116A by a large animal such as a bear. To address this issue, in one embodiment, the cover 114 may comprise a thickened area of the base wall 126B adjacent to the opening 116 and actuation member 112. In this case, the opening 116 comprises a hole formed through the cover 114. In an alternative embodiment, the cover 114 may comprise a separate plate mounted to the exterior of the container 102 about the opening 116 and actuation member 112. The plate may be fabricated of the same material used in the construction of the container 102 or the shrouds 120, or another material possessing appropriate strength, toughness, and durability. In this case, the opening 116 comprises substantially overlapping holes formed in the cover 114 and the base wall 126B of the container 102. Advantageously, the opening 116A and cover 114 provide access to the actuation member 112 in order to unlatch the latch mechanism 110, while acting to inhibit an animal from using the opening 116A to forcibly gain access to the container interior 130.

The shrouds 120, illustrated in FIG. 3A, provide another mechanism by which the system 100 inhibits undesired animal access to the container interior 130. In general, the shrouds 120 are configured to fit closely to the profile of the edges 144 of the container lid 106 and recess the interface between the lid 106 and the base 104 when the lid 106 is in the closed position. As discussed below, this shroud 120 configuration inhibits an animal from gaining access to the interface, inserting their claws into the interface, and exerting sufficient force to overcome the resistance of the latches 202 when the lid 106 is secured to the base 104 with the latches 202.

In one embodiment, illustrated in FIG. 3A, the shrouds 120 are generally "C"-shaped, possessing upper and lower ends 306A and 306B, an upper portion 310A, a center portion 310B, and a lower portion 310C. The length 312 of the shrouds 120 is dimensioned so as to substantially span the base walls 126. The center portion 310B is generally rectangular and planar, possessing a width 314 greater than that of the lip 136 of the container base 104. The upper portion 310A of the shroud 120 is generally planar and possesses a contour 316 which is adapted to mate with the edges 144 of the lid 106. The upper portion 310A also possesses a thickness 320 sufficient to recess the lid 106 below the shroud 120 by a selected shroud offset distance 320. In one embodiment, the shroud offset distance 320 is approximately 0.75-1 inches. The upper portion 310A of the shroud 120 is interconnected to the center portion 310B at the shroud upper end 306A and extends outward, generally perpendicular to the plane of the center portion 310B. As will be discussed in greater detail below, the width 314 of the center portion 310B and the thickness 320 and contour 316 of the upper portion 310A of the shroud 120 allow the shroud 120 to recess the lid 106 and inhibit animal access to the interface between the lid 106 and base 104 when the latch mechanism secures the lid 106 in the closed position.

In one embodiment, the shroud 120 is anchored to the base 104, approximately at the lip 136, using the center and lower portions 310B and 310C. The lower portion 310C possesses an "L"-shape and is interconnected to the center portion 310B the lower end 306B of the shroud 120. Connected in this manner, the lower portion 310C of the shroud 120 first extends generally perpendicular to the plane of the center portion 310B, then bends approximately 90 degrees to extend parallel to the plane of the center portion 310B, as illustrated in FIG. 3A. The center portion 310B of the shroud 120 is placed against the lip 136 of the container base 104, with the upper portion 310A resting upon the upper end 134 of the container base 104 and the lower portion 310C positioned within the space 140 defined by the walls 126 and the lip 136. So positioned, the upper portion 310A of the shroud 120 abuts the edges 144 of the lid 106 when the lid 106 is in the closed position.

The shroud 120 may be mounted to the base 104 by fasteners 322 such as rivets or nuts and bolts or other attachment mechanisms such as adhesives. Advantageously, when mounted using fasteners 322, as illustrated in FIG. 3A, the fasteners 322 may connect the shroud 120 to the lip 136 by passing through the shroud 120 at two points, firmly anchoring the shroud 120 to the base 104 and reducing the likelihood that an animal can forcibly remove the shroud 120 to gain access to the lower surface 142B of the container lid 106.

In a further advantage, the shroud offset distance 320 and the close fit engineered between the edges 144 of the lid 106 act to inhibit an animal from forcibly opening the container 102. The close fit provides substantially little space for an animal, particularly a bear, to insert their claw between the shroud 120 and the edges 144 of the lid 106. Furthermore, should the animal succeed in inserting their claw between shroud 120 and the edges 144 of the lid 106, below the upper edge 306A of the shroud 120, the distance inserted is likely to be small, less than the shroud offset distance 320. Thus, the configuration of the shrouds 120 inhibit an animal from gaining access to the interface between the lid 106 the base 104 and exerting sufficient force to overcome the resistance of latch mechanism 110. In this manner, the system 100 utilizes the shrouds 120 as a second protection, which works in conjunction with the latch mechanism 110, to guard against animal access to the container 102.

The shroud 120 also performs a second function by reinforcing the upper end 134 of the container base 104. Lacking this reinforcement, an animal, such as a bear, may be able to distort the shape of the container base 104 using their strength or body weight. In this event, the lid 106 may become dislodged from its protected, recessed position, exposing a portion of at least one of the lid edges 144. In this position, the lid 106 becomes vulnerable to forced opening, even if the latch mechanism is secured to the lid 106, as discussed above. Thus, placement of the shrouds 120 about the container mouth 132 substantially inhibits an animal from deforming the mouth 132 and dislodging the lid 106. Furthermore, in one embodiment, the shrouds 120 may be fabricated from a metal in order to enhance their strength and improve their reinforcing capability.

The number of shrouds 120 employed in the system 100 may be varied, depending upon the level of protection desired for the container 102. In one embodiment, where moderate protection is desired, such as against small scavengers, two shrouds 120 may be utilized. In this configuration, the shrouds 120 are mounted on opposing edges 144C-D of the lid 106, adjacent to the hinge 124.

In an alternative embodiment, where greater protection against animals is desired, such as against bears or other large animals, a third shroud 120 may be provided, mounted on the edge 144B of the lid 106 opposite the hinge 124. The three shrouds 120 are dimensioned in length 312 so as to lie substantially adjacent to one another at the corners of the base 104 and recess the lid 106 approximately continuously along the edges 144B, 144C, 144D of the lid 106. The lower portion 310C of the shroud 120 opposite the hinge 124 may be omitted, so as to prevent the lower portion 310C from blocking access to the opening 116. In a further alternative embodiment, the shroud 120 may be formed of one piece which borders the three edges 144B, 144C, 144D of the lid 106 and provides protection comparable to three individual shrouds 120. Beneficially, embodiments of the system 100 configured with two shrouds 120 may be fabricated at a lower cost compared with systems 100 equipped with three shrouds 120, owing to lower material and labor costs. This flexibility allows the home, corporate, or government customer to select the system 100 best suited to their protection needs and budget.

Figure 3B:
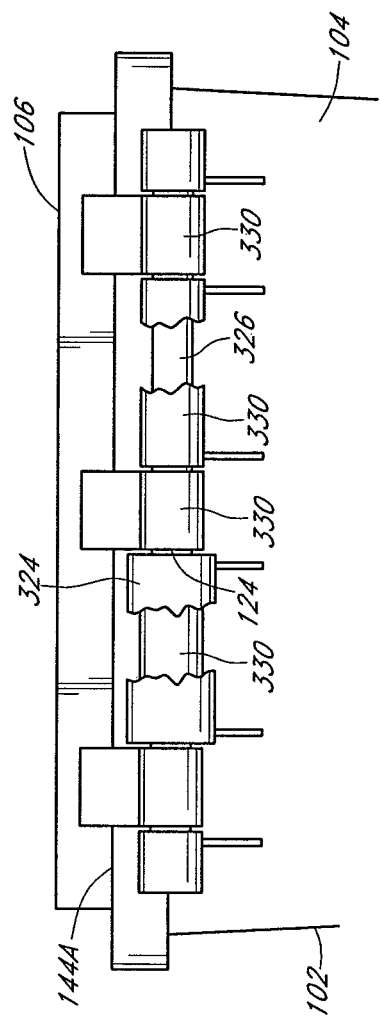

In certain embodiments, the system may also be configured to protect the hinge 124. As illustrated in the embodiment of FIG. 3B, the hinge 124 may comprise a rod 326 which is inserted within sockets 330 interconnected to the lid 106 and base 104. The sockets 330 may be formed of the same molded plastic as the container 102. Shrouds 120, such as those described above, are not suitable for protecting the hinge 124, however, as such a shroud 120 may interfere with the motion of the hinge 124 between the open and closed positions of the lid 106. Thus, embodiments of the system 100 may further comprise hinge shrouds 324. The hinge shrouds 324 may comprise small plates, brackets, or molded components, formed of metals or plastics, which substantially cover the length of the hinge 124 and protect it from damage. For example, FIG. 3B illustrates a molded plastic hinge shroud 324 which substantially surrounds the socket 330. The hinge shrouds 324 may be attached frictionally or mechanically to the hinge 124. The hinge shrouds 324 may also be employed with any configuration of the shrouds 120.

FIG. 3A also illustrates one embodiment of the protective member 122, which works both alone and in conjunction with the shrouds 120 to reinforce the lid 106. The protective member 122 comprises a rigid band which is mounted to the lid 106 at approximately the edges 144B-D, and substantially spans the edges 144B-D. In one embodiment, the protective member 122 comprises a metal band 122. So configured, when the lid 106 is placed in the closed position, the protective member 122 is positioned adjacent to the interface of the lid 106 with the base 104 and to the shrouds 120. Thus, should an animal attempt to distort the shape of the container base 104 in order to dislodge the recessed lid 106 and gain access to the container interior 130, both the protective metal band 122 and the shrouds 120 act to resist the force exerted by the animal. Advantageously, should the animal succeed in removing one or more of the shrouds 120 from the base, when the lid 106 is closed, the protective member 122 will still function as a secondary reinforcement against attempts to distort the lid 106 and gain access to the container interior 130.

In a further advantage, the system 100 also avoids premature failure of the container, a common problem with existing systems for inhibiting animal access to containers. Typically, other animal-resistant systems rely upon solid, heavy structures attached to the container lid which are designed to resist deformation from an animal attempting forcible entry into a container. The added weight of the reinforcement upon the lid, however, often causes fatigue failure of the container at the lid 106 or hinge 124, reducing the lifetime of the container and necessitating the costly replacement of the container. In contrast, the shrouds 120, latch mechanism 110, actuation member 112, and cover 114 of the system 100, are located on the container base 104. Only the relatively light protective member 122 is positioned on the lid 106, providing a modest increase in the weight of the lid 106 As a result, the system 100 allows a container 102 to be protected from animal access without adding significant weight to the lid 106 and the resultant premature failure of the container 102.

Figure 4A:
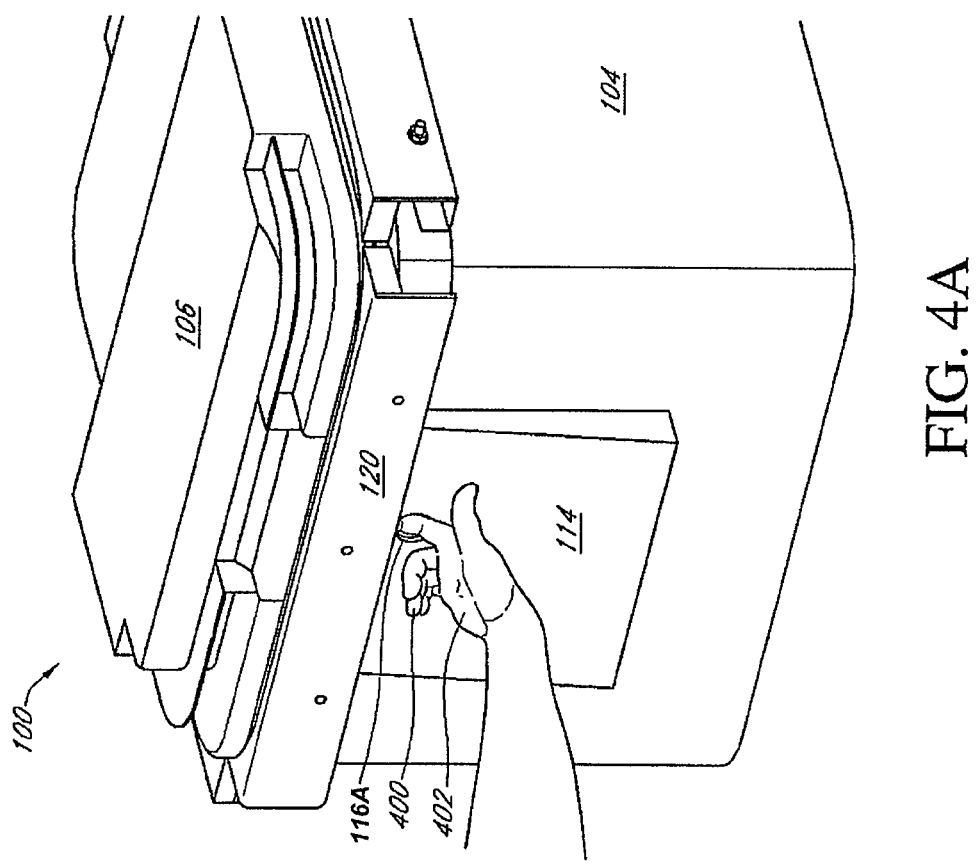
FIGS. 4A-4B illustrate front and rear views of the animal-resistant latching system of FIG. 1 operated by a human hand.
Figure 4B:
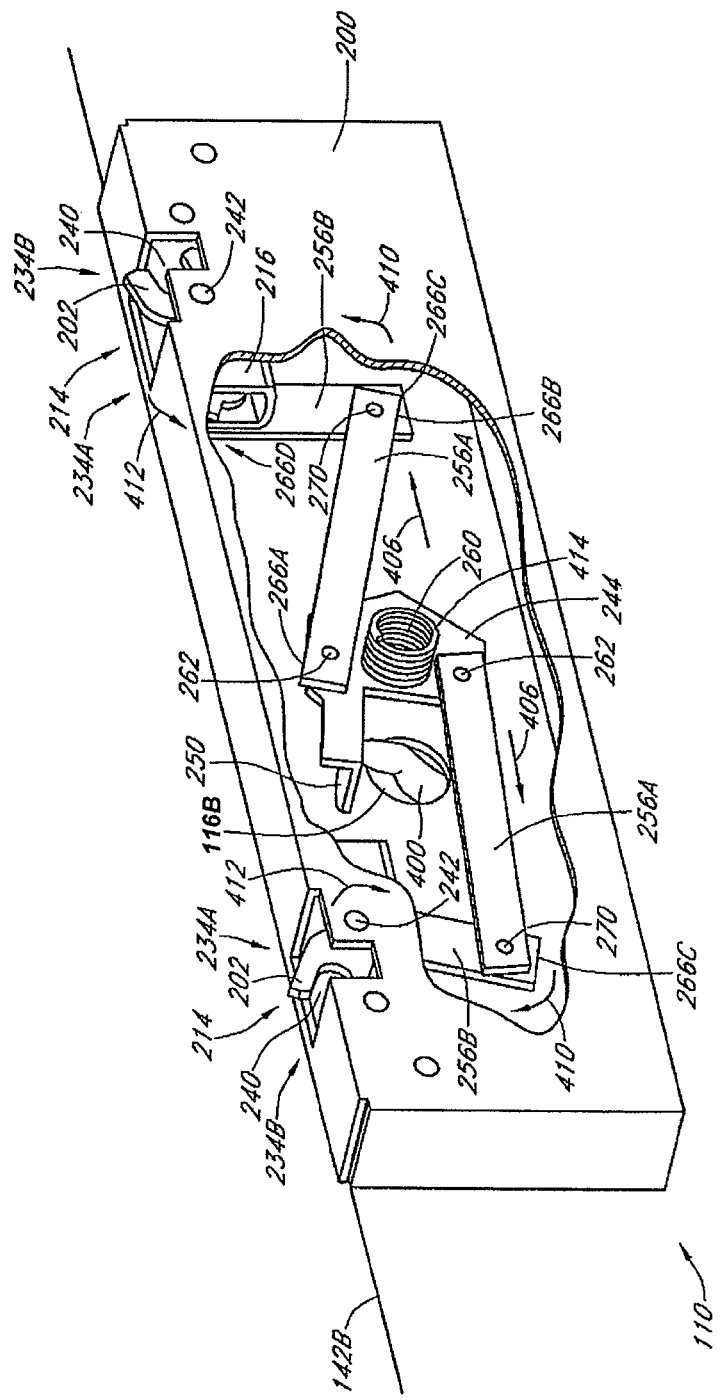

FIGS. 4A-4B illustrate one embodiment of the unlatching operation of the latching system 100, performed by the fingers 400 of a single human hand 402. As shown in FIG. 4A, the fingers 400 extend outward, generally perpendicular to the plane of the cover 114, adjacent to the openings 116A, 116B. The fingers 400 are inserted within the openings 116A, 116B, curled towards the lever 250, and pressed against the lever 250. As illustrated in FIG. 4B, the motion of the fingers 400 against the lever 250 causes the cam body 244 to rotate about the central cam body pivot 260. In response to rotation of the cam body 244, first cam arms 252A translate horizontally (arrow 406), a motion which causes the second end 266C of the second cam arm 256B to rotate (arrow 410), about the cam arm pivot 270. The rotation of the second cam arm 256B in turn rotates the first end 266D of the second cam arm 256B and the second end 234B of the latch 202 about the latch pivot 242 (arrow 412). The upward rotation of the latch 202 continues in response to the rotation of the lever 250 until the latch 202 contacts the aperture 214 in the housing 200. In this position, the latch mechanism 110 is in the unlatched orientation and the lid 106 may be moved from the closed to the open position.

This design of the latch mechanism 110 provides a number of advantages. As illustrated in FIGS. 4A-B, the system 100 may be unlatched by a single hand 402 using a simple curling and thrusting motion of the fingers 400. These motions may be performed easily by most users, even those who may possess limited strength or dexterity, such as children or older users. This ease of use is in contrast to currently existing bear-proofing systems, which employ actuation members which are difficult to access and operate. Furthermore, the ability of the system 100 to be unlatched using a single hand 402 is of great benefit to users who only have one available hand to access the latching mechanism 110, such as when a hand is utilized to hold a garbage bag.

In certain embodiments, the rotatable actuation member 112 may be returned to its latched state using a biasing member 414 when the fingers 400 are removed from the lever 250. In one embodiment, the biasing member 414 is mounted within the latch mechanism 110 and acts to bias the latches 202 in the latched orientation. As illustrated in FIG. 4B, the biasing member 414 may comprise a torsional spring 414 positioned at the central cam body pivot 260, interconnected with the housing 200 and the cam body 244. The torsional spring 414 may be configured such that the spring 414 is at rest when the latch 202 is in the latched orientation. As described above, actuation of the lever 250 by the user's fingers 400 rotates latch 202 towards the unlatched orientation, pulling the torsional spring from its rest position. Removal of the fingers 400 from the lever 250 removes the force on the spring 414 and the spring 414 returns to its rest position, urging the latch 202 and the lever 250 back to their latched orientation. Advantageously, in this design, the latch mechanism 110 returns to its latched orientation without user intervention. In an alternative implementation (not shown), the biasing member 414 may comprise a torsional spring 414 positioned at the latch pivot, interconnected to the latch mount 216 and latches 202, so as to bias the latches 202 into the latched orientation.

The latches 202 further work in concert with the biasing members 414 to move the latches 202 into the latched orientation upon closure of the lid 106 from the open position, without the user operating the actuation member 112. As discussed above, when the lid 106 is in the open position, without actuation of the actuation member 112, the biasing member 414 urges the latch mechanism 110 into the latched orientation. As the lid 106 is moved from the open to closed position, the striker pins move through the apertures 214 in the latch housing 200 to contact the latches 202. As the lid 106 moves towards the closed position, the striker pins exert a downward force on the latches 202, urging the latches 202 to pivot downward, away from the apertures 214. During this downward rotation of the latches 202, the position at which the striker pins contacts the latches 202 also translates horizontally with respect to the stationary striker pins towards the second end 234B of the latches 202. When the striker pins approximately reach the second end 234B of the latches 202, the striker pins may move downward toward the closed position, unimpeded by the latches 202. Upon reaching the closed position, the striker pins are positioned adjacent to the channel 240 of the latches 202. In this position, the downward force urging the rotation of the latches 202 is removed and the biasing member 414 urges the latches 202 to rotate upward, back toward the rest position. In this upward rotation, the striker pins are captured within the latch channel 240, securing the lid 106 in the latched orientation. The latch mount 216 prevents the latches 202 from being pushed down beyond the closed position in order to prevent damage to the latches 202 or biasing member 414.

Beneficially, this design automatically latches the lid 106 when it is moved to the closed position. Thus, the system 100 eliminates the need for the user to remember to re-latch the animal-resistant system 100 upon closing the lid 106. Furthermore, engaging the latches 202 is a simple matter of exerting downward pressure on the lid, easily accomplished by users of the system 100, regardless of age or physical handicap. Thus, because latching the system is easy to lock and the latch mechanism 110 automatically resets itself, the likelihood that the system 100 is inadvertently left unlatched in the closed position by the user is small, enhancing the security and ease of use of the system 100.

Figure 5A:
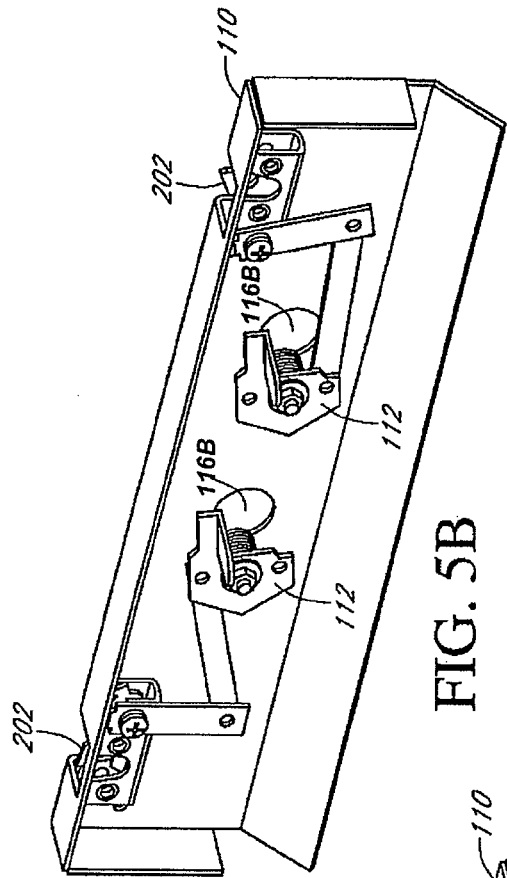
FIGS. 5A-5C illustrate embodiments of the latching mechanism.
Figure 5C:
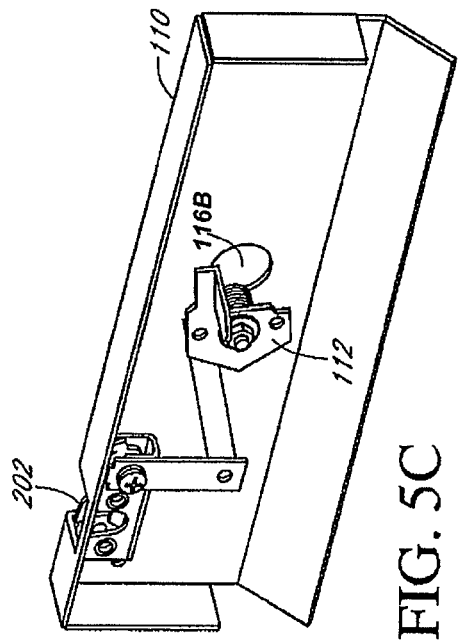
Figure 5B:
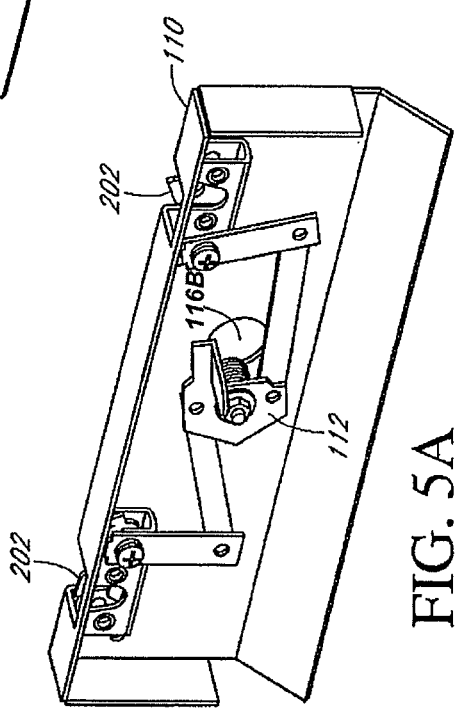

Embodiments of the system 100 may also be configured for use with the container 102 to provide greater or fewer latches 202, as dictated by the level of security needed for the container (FIGS. 5A-C). In the embodiment of FIG. 5A, configuration A, the system may utilize two rotary latches 202 linked together by a single actuation member 112, accessible through a single opening 116. In the embodiment of FIG. 5B, configuration B, the system may utilize two rotary latches 202 which are independently actuated by two separate actuation members 112, accessed through separate openings 116. In further embodiments, FIG. 5C illustrates configuration C, in which the system 100 may utilize a single latch 202 in communication with a single actuation member 112.

Advantageously, these different configurations of the system 100 provide users with the flexibility to choose the combination of animal protection and cost best suited for their container application. Configuration B provides the greatest resistance to animal entry, as the two latches 202 constrain the lid in place and each latch must be independently actuated. This configuration is implemented at the greatest expense, though, due to the need for multiple actuation members 112 and latches 202. Conversely, Configuration C provides the least resistance to animal entry, as the lid is constrained by a single latch 202 actuated by actuation member 112 and may be employed at the least expense, due to the need for fewer actuation members 112 and latches 202 compared to configuration B. Configuration A provides a compromise between configurations A and B, providing greater resistance to animal entry than configuration A, owing to the presence of two latches 202, but at a cost less than configuration C, as only a single actuation member 112 is employed.

Figure 6:
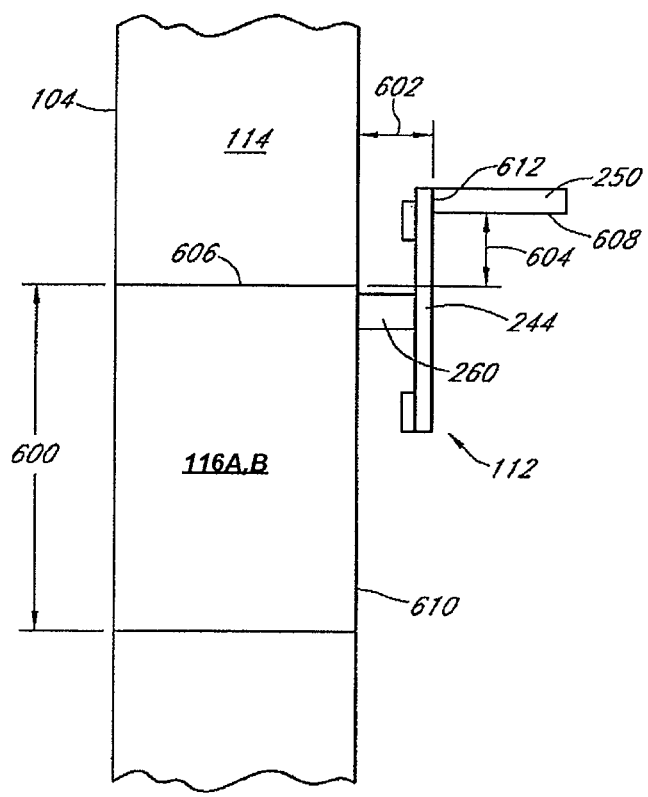
FIG. 6 presents a side view of the animal-resistant latching system of FIG. 1, illustrating one embodiment of the selected dimensions of the system which inhibit access to the actuation member by animals.

In one embodiment, the size and position of the openings 116A, 116B and the actuation member 112 are selected on the basis of human and animal physiology. These parameters, illustrated in FIG. 6, are selected so as to allow access to and actuation of the actuation member 112 by human hands but inhibit such access and actuation by the claws of animals. The parameters values discussed below in respect to FIG. 6 are, in particular, designed to inhibit the access of bears to the container. However, alternative embodiments of the system 100 may utilize different parameter values, selected to specifically inhibit the access of other animals to the container.

The cover 114 is present on the outer surface of the base and serves as a protective mechanism to inhibit access to the actuation member 112 and latch mechanism by animals such as bears. The openings 116A, 116B possess a selected diameter 600 which allows human fingers to be inserted within the openings 116A, 116B. In one embodiment, the diameter 600 is approximately 1.25 inch. Advantageously, in addition to accommodating human users with bare hands, this diameter 600 is large enough to accommodate users wearing thick work gloves, such as sanitation workers, without requiring the removal of the gloves.

The actuation member 112 is also designed to inhibit bears from actuating the lever 250 through the opening 116 but allowing humans to easily actuate the actuation member 112. This goal is accomplished by sizing and positioning the central cam body pivot 260 pivot in relation to the opening 116 such that when the cam body 244 is mounted on the pivot 260, the rest position of the lever 250 is recessed from the openings 116A, 116B by a selected horizontal lever offset distance 602 and a vertical lever offset distance 604. The vertical lever offset distance 604 is measured approximately between the horizontal edge 606 of the opening 116 and the horizontal edge 608 of the lever 250, while the horizontal offset distance 602 is measured approximately between the vertical edge 610 of the opening 116 and the vertical edge 612 of the lever 250. In the embodiment of FIG. 6, the distances 602 and 604 are each approximately 0.5 inch.

Advantageously, the configuration of the access hole diameter 600 and the lever offset distances 602 and 604 place the lever 250 in a location substantially inaccessible to a bear. The reach of a bear's paw is limited by the extent of its claw and the inability of the bear to extend or bend its claw beyond a certain angle from the plane of their paw. Thus, in embodiments of the system which utilize the selected diameter 600 and offset distances 602 and 604, should a bear insert their claw through the openings 116A, 116B, they would be substantially unable to bend their claws sufficiently to substantially contact the lever 250 and actuate the latches 202 from the latched to unlatched positions. In contrast, these actions are easily performed by a human hand, as human fingers are sufficiently long and may bend and extend enough to manipulate the cam body 244.

From the foregoing, it will be appreciated that the animal-resistant system disclosed herein protects a container to which it is installed by multiple mechanisms from animal access. The latch mechanism secures the container lid to the container base, and inhibits the lid from moving from the closed to open positions while the latch mechanism is latched. The configuration of the latch mechanism, actuation member, and opening are configured to allow access humans with flexible hands but inhibit access to animals with rigid claws, as well as automatically place the latch mechanism in the latched orientation when the lid is closed. Further, the shrouds act both to inhibit animals from positioning their claws under the lid and prying the lid open from the closed position, as well as reinforce the system from deformation which might unseat the lid. Thus, the system protects the container from animal attack and user error while still providing an easy to access container.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. An animal-resistant system for securing a lid of a container having a base, wherein the lid is positioned inward of the base, the system comprising:
   at least one latch mechanism that interconnects the lid and the base of the container, wherein the at least one latch mechanism has a first orientation wherein the lid and the base are secured together and a second orientation wherein the lid can be removed from the base wherein the at least one latch mechanism is concealed from view and wherein the at least one latch member remains in the first orientation regardless of the orientation of the latch member with respect to gravity;
   at least one actuation member coupled to the at least one latch mechanism wherein a user can manipulate the actuation member to thereby manipulate the at least one latch from the first to the second orientation;
   a cover that covers the actuation member, wherein the cover defines an opening that is spaced from the actuation member a distance and direction selected to permit user manipulation of the actuation member by a human finger but to inhibit manipulation by an animal claw; and at least one shroud member mounted to the base of the container adjacent the interface between the base and the lid of the container, to thereby inhibit an animal from accessing an edge of the lid of the container, wherein the at least one shroud member is formed of a metal material of a sufficient strength and is further shaped to prevent a bear from deforming the base of the container adjacent the lid by exerting force or weight against the base of the container adjacent the shroud; and a protective member mounted on the portion of the lid of the container that is adjacent to the interface with the base, wherein the protective member is formed of a rigid material so as to inhibit the bear from deforming the portion of the lid adjacent the interface of the base.

2. The system of claim 1, wherein the at least one latch mechanism comprises a first and a second latch mechanism.

3. The system of claim 2, wherein the at least one actuation member comprises a first and a second actuation member respectively coupled to the first and second latch mechanisms.

4. The system of claim 2, wherein the at least one actuation member comprises a single actuation member coupled to the first and second latch mechanisms.

5. The system of claim 1, wherein the at least one latch mechanism includes a spring loaded latch that automatically latches into the first orientation when the lid is closed on the cover and wherein the at least one latch mechanism comprises a rotary actuated latch that rotational movement of the actuation member results in manipulation of the at least one latch from the first orientation to the second orientation.

6. The system of claim 1, wherein the opening is sized and the actuation member is mounted with respect to the opening in the cover so as to be recessed from the opening horizontal and vertical distances selected so as to allow manipulation of the actuation member by a human finger by insertion of the finger into the hole and then bending the finger at the digital joint to thereby contact the actuation member and rotate the actuation member upward.

7. The system of claim 6, wherein the opening has a diameter of approximately 1¼ of an inch and the actuation member is positioned approximately ½ of an inch adjacent from an edge of the opening and is recessed approximately ½ of an inch from the edge opening.

8. The system of claim 1, wherein the protective member comprises a metal band installed on the surface of the lid adjacent to the inner surface of the base.

9. The system of claim 1, wherein the at least one shroud member comprises a plurality of shroud members that extend about at least 3 of the 4 sides of the base and extend upward from the upper surface of the base a distance selected to inhibit an animal from inserting its claw into the interface between the base and the lid.

10. The system of claim 9, wherein the plurality of shroud members extend upward from the upper surface of the base a distance of approximately ¾ to 1 inch above the interface.

11. The system of claim 1, wherein the plurality of shrouds extend over the upper surface of the base so as to inhibit the bear from deforming the shape of the base.

12. The system of claim 1, where in the container comprises a refuse cart.

13. An animal-resistant system for securing a lid of a container having a base wherein the lid is positioned inward of the base, the system comprising:

at least one latch mechanism that interconnects the lid and the base of the container, wherein the at least one latch mechanism has a first orientation wherein the lid and the base are secured together and a second orientation wherein the lid can be removed from the base wherein the at least one latch mechanism is concealed from view and wherein the at least one latch member remains in the first orientation regardless of the orientation of the latch member with respect to gravity;

at least one actuation member coupled to the at least one latch mechanism wherein a user can manipulate the actuation member to thereby manipulate the at least one latch from the first to the second orientation; and at least one shroud member that is mounted on the inner edge of the base of the container, adjacent to the interface between the base and the lid of the container, to thereby inhibit an animal from accessing an edge of the lid of the container adjacent to the base wherein the shroud member is formed of a metal material of sufficient strength and is further shaped to inhibit a bear from deforming the base of the container by exerting force or weight against the base of the container adjacent the shroud.

14. The system of claim 13, further comprising a protective member mounted on the portion of the lid of the container that is adjacent to the interface with the base, wherein the protective member is formed of a rigid material so as to inhibit the bear from deforming the portion of the lid adjacent to the interface with the base.

15. The system of claim 13, wherein the protective member comprises a metal band installed on the surface of the lid adjacent to the inner surface of the base.

16. The system of claim 13, wherein the at least one shroud member comprises a plurality of shroud members that extend about at least 3 of the 4 sides of the base and extend upward from the upper surface of the base a distance selected to inhibit an animal from inserting its claw into the interface between the base and the lid.

17. The system of claim 16, wherein the plurality of shroud members extend upward from the upper surface of the base a distance of approximately ¾ to 1 inch above the interface.

18. The system of claim 13, wherein the plurality of shrouds extend over the upper surface of the base so as to inhibit the bear from deforming the shape of the base.

19. The system of claim 13 further comprising a cover that covers the actuation member, wherein the cover defines an opening that is spaced from the actuation member a distance and direction selected to permit user manipulation of the actuation member by a human finger but to inhibit user manipulation by an animal claw.

20. The system of claim 13, wherein the at least one latch mechanism comprises a first and a second latch mechanism.

21. The system of claim 20, wherein the at least one actuation member comprises a first and a second actuation member respectively coupled to the first and second latch mechanisms.

22. The system of claim 20, wherein the at least one actuation member comprises a single actuation member coupled to the first and second latch mechanisms.

23. The system of claim 13, wherein the at least one latch mechanism includes a spring loaded latch that automatically latches into the first orientation when the lid is closed on the cover and wherein the at least one latch mechanism comprises a rotary actuated latch that rotational movement of the actuation member results in manipulation of the at least one latch from the first orientation to the second orientation.

24. The system of claim 13, wherein the opening is sized and the actuation member is mounted with respect to the opening in the cover so as to be recessed from the opening horizontal and vertical distances selected so as to allow manipulation of the actuation member by a human finger by insertion of the finger into the hole and then bending the finger at the digital joint to thereby contact the actuation member and rotate the actuation member upward.

25. The system of claim 23, wherein the opening has a diameter of approximately 1¼ of an inch and the actuation member is positioned approximately ½ of an inch adjacent from the edge of the opening and is recessed approximately ½ of an inch from an edge of the opening.

26. An animal-resistant container, comprising:
a receptacle having a base and a lid, wherein the lid is positioned inward of the base;
at least one latch mechanism that interconnects the lid and the base of the container, wherein the at least one latch mechanism has a first orientation wherein the lid and the base are secured together and a second orientation wherein the lid can be removed from the base wherein the at least one latch mechanism is concealed from view and wherein the at least one latch member remains in the first orientation regardless of the orientation of the latch member with respect to gravity;
at least one actuation member coupled to the at least one latch mechanism wherein a user can manipulate the actuation member to thereby manipulate the at least one latch from the first to the second orientation;
a cover that covers the actuation member, wherein the cover defines an opening that is spaced from the actuation member a distance and direction selected to permit user manipulation of the actuation member by a human finger but to inhibit manipulation by an animal claw; and
at least one shroud member mounted to the base of the container adjacent the interface between the base and the lid of the container, to thereby inhibit an animal from accessing an edge of the lid of the container, wherein the at least one shroud member is formed of a metal material of a sufficient strength and is further shaped to inhibit a bear from deforming the base of the container adjacent the lid by exerting force or weight against the base of the container adjacent the shroud; and
a protective member mounted on the portion of the lid of the container that is adjacent to the interface with the base, wherein the protective member is formed of a rigid material so as to inhibit the bear from deforming the portion of the lid adjacent the interface of the base.

27. The system of claim 26, wherein the at least one latch mechanism comprises a first and a second latch mechanism.

28. The system of claim 27, wherein the at least one actuation member comprises a first and a second actuation member respectively coupled to the first and second latch mechanisms.

29. The system of claim 27, wherein the at least one actuation member comprises a single actuation member coupled to the first and second latch mechanisms.

30. The system of claim 26, wherein the at least one latch mechanism includes a spring loaded latch that automatically latches into the first orientation when the lid is closed on the cover and wherein the at least one latch mechanism comprises a rotary actuated latch that rotational movement of the actuation member results in manipulation of the at least one latch from the first orientation to the second orientation.

31. The system of claim 26, wherein the opening is sized and the actuation member is mounted with respect to the opening in the cover so as to be recessed from the opening horizontal and vertical distances selected so as to allow manipulation of the actuation member by a human finger by insertion of the finger into the hole and then bending the finger at the digital joint to thereby contact the actuation member and rotate the actuation member upward.

32. The system of claim 31, wherein the opening has a diameter of approximately 1¼ of an inch and the actuation member is positioned approximately ½ of an inch adjacent from the edge of the opening and is recessed approximately ½ of an inch from an edge of the opening.

33. The system of claim 26, wherein the protective member comprises a metal band installed on the surface of the lid adjacent to the inner surface of the base.

34. The system of claim 26, wherein the at least one shroud member comprises a plurality of shroud members that extend about at least 3 of the 4 sides of the base and extend upwards from the upper surface of the base a distance selected to inhibit an animal from inserting its claw into the interface between the base and the lid.

35. The system of claim 34, wherein the plurality of shroud members extend upward from the upper surface of the base a distance of approximately ¾ to 1 inch above the interface.

36. The system of claim 26, wherein the plurality of shrouds extend over the upper surface of the base so as to inhibit the bear from deforming the shape of the base.

37. The system of claim 26, wherein the container comprises a refuse cart.

38. An animal-resistant system for securing a lid of a container having a base wherein the lid is positioned inward of the base, the system comprising:
at least one latch mechanism that interconnects the lid and the base of the container, wherein the at least one latch mechanism has a first orientation wherein the lid and the base are secured together and a second orientation wherein the lid can be removed from the base wherein the at least one latch mechanism is concealed from view and wherein the at least one latch member remains in the first orientation regardless of the orientation of the latch member with respect to gravity;
at least one actuation member coupled to the at least one latch mechanism wherein a user can manipulate the actuation member to thereby manipulate the at least one latch from the first to the second orientation; and
at least one shroud member that is mounted to the base of the container, adjacent to the interface between the base and the lid of the container, to thereby inhibit an animal from accessing an edge of the lid of the container adjacent to the base wherein the shroud member is formed of a metal material of sufficient strength and is further shaped to inhibit a bear from deforming the base of the container by exerting force or weight against the base of the container adjacent the shroud.

39. The system of claim 38, further comprising a protective member mounted on the portion of the lid of the container that is adjacent to the interface with the base, wherein the protective member is formed of a rigid material so as to inhibit the bear from deforming the portion of the lid adjacent to the interface with the base.

40. The system of claim 38, wherein the at least one shroud member is mounted on the inner edge of the base of the container, adjacent to the interface between the base and the lid of the container.

41. The system of claim 38, wherein the protective member comprises a metal band installed on the surface of the lid adjacent to the inner surface of the base.

42. The system of claim 38, wherein the at least one shroud member comprises a plurality of shroud members that extend about at least 3 of the 4 sides of the base and extend upward from the upper surface of the base a distance selected to inhibit an animal from inserting its claw into the interface between the base and the lid.

43. The system of claim 42, wherein the plurality of shroud members extend upward from the upper surface of the base a distance of approximately ¾ to 1 inch above the interface.

44. The system of claim 38, wherein the plurality of shrouds extend over the upper surface of the base so as to inhibit the bear from deforming the shape of the base.

45. The system of claim 38 further comprising a cover that covers the actuation member, wherein the cover defines an opening that is spaced from the actuation member a distance and direction selected to permit user manipulation of the actuation member by a human finger but to inhibit user manipulation by an animal claw.

46. The system of claim 38, wherein the at least one latch mechanism comprises a first and a second latch mechanism.

47. The system of claim 46, wherein the at least one actuation member comprises a first and a second actuation member respectively coupled to the first and second latch mechanisms.

48. The system of claim 46, wherein the at least one actuation member comprises a single actuation member coupled to the first and second latch mechanisms.

49. The system of claim 38, wherein the at least one latch mechanism includes a spring loaded latch that automatically latches into the first orientation when the lid is closed on the cover and wherein the at least one latch mechanism comprises a rotary actuated latch that rotational movement of the actuation member results in manipulation of the at least one latch from the first orientation to the second orientation.

50. The system of claim 38, wherein the opening is sized and the actuation member is mounted with respect to the opening in the cover so as to be recessed from the opening horizontal and vertical distances selected so as to allow manipulation of the actuation member by a human finger by insertion of the finger into the hole and then bending the finger at the digital joint to thereby contact the actuation member and rotate the actuation member upward.

51. The system of claim 50, wherein the opening has a diameter of approximately 1¼ of an inch and the actuation member is positioned approximately ½ of an inch adjacent from the edge of the opening and is recessed approximately ½ of an inch from an edge of the opening.

* * * * *

UNITED STATES PATENT AND TRADEMARK OFFICE
CERTIFICATE OF CORRECTION

PATENT NO.         : 8,479,944 B2                                    Page 1 of 1
APPLICATION NO.    : 12/728155
DATED              : July 9, 2013
INVENTOR(S)        : David E. Moore It is certified that error appears in the above-identified patent and that said Letters Patent is hereby corrected as shown below:

On the Title Page (Item 56), Col. 2, Line 3, under Other Publications, please change "Recyding" to --Recycling--.

In the Claims

In Column 15, Line 41, Claim 7, please change "an" to --the--.

In Column 15, Line 43, Claim 7, please change "the edge" to --an edge of the--.

In Column 15, Line 59, Claim 12, please change "where in" to --wherein--.

Signed and Sealed this
Thirty-first Day of December, 2013

Margaret A. Focarino
*Commissioner for Patents of the United States Patent and Trademark Office*